Dec. 4, 1934.  B. H. URSCHEL  1,982,890
TUBULAR AXLE
Filed March 23, 1933  2 Sheets-Sheet 1

Inventor
Bertis H. Urschel
By Faust G. Crampton
Attorney

Dec. 4, 1934.　　　　B. H. URSCHEL　　　1,982,890
TUBULAR AXLE
Filed March 23, 1933　　　2 Sheets-Sheet 2

Inventor
Bertis H. Urschel
By Faust F. Crampton
Attorney

Patented Dec. 4, 1934

1,982,890

UNITED STATES PATENT OFFICE 1,982,890

TUBULAR AXLE

Bertis H. Urschel, Bowling Green, Ohio

Application March 23, 1933, Serial No. 662,305

2 Claims. (Cl. 301—124)

My invention has for its object to provide efficient stub axle bearing members integrally formed in vehicle main tubular axles, the parts being bonded to prevent rupture at the point of connection between the main axle and the bearing members.

The invention particularly relates to a tubular main axle formed from a seamless steel tubing and so formed that it is substantially cylindrical throughout its length, except for such deviation from the cylinder, or broad elliptical cross section, that may be made intermediate the ends to afford a means for securing the axle to the spring of the vehicle to resist movement due to torsional strains and swaying stresses.

As is well known in connection with automobile axles, the main axle having stub axles, usually the front axle, is subject to high torsional strains at the stub axle bearings, due to the shape of the main axle that depends from the stub axles to lower the chassis of the automobile. This is especially true in connection with automobiles having four-wheel brakes, wherein the bearing members of the stub axles are supported in end portions of the main axles that protrude beyond the bends of the main axle.

My invention particularly provides bearing members with the required dimensions and having the required strength to transmit the stresses that occur in the use of such a construction. They are provided with channeled cylindrical body portions and edge portions of the top and bottom of the axle and flanges extend into and fit in the channels of the bearing members. These parts conform to the cylindricity of the enclosed body portions of the bearing member and are welded in the channels and to the body portions of the bearing members to bond securely the members in the end portions of the main axle. The flanges operate in conjunction with the interwelded portions to hold the bearing members in position, as against rupture of the end portions of the axle or separation of the contacting surfaces of the bearing members and the end portions of the axle.

My invention may be contained in axle constructions that may vary in their details, and to illustrate a practical application of the invention, I have selected two axle structures as illustrative of the various structures in which the invention may be embodied. The axle structures selected are described hereinafter and shown in the accompanying drawings.

Figure 1:
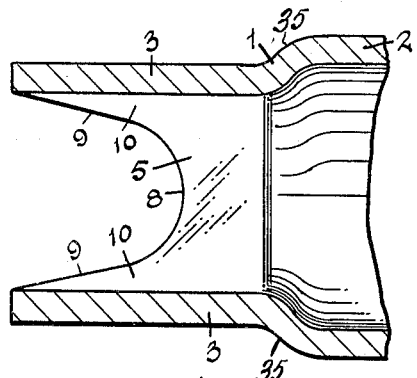
Figure 2:
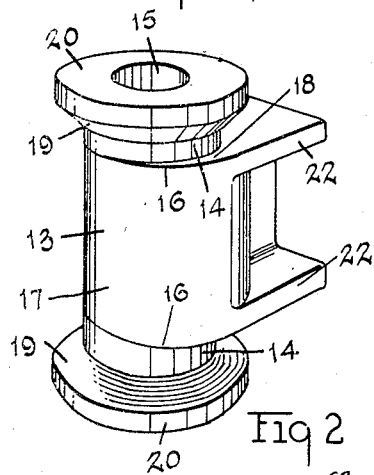
Figure 3:
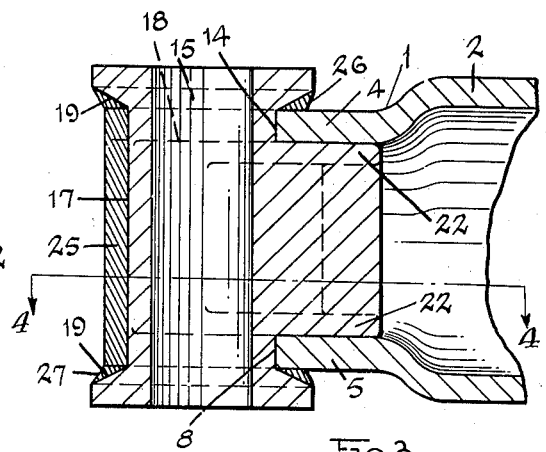
Figure 4:
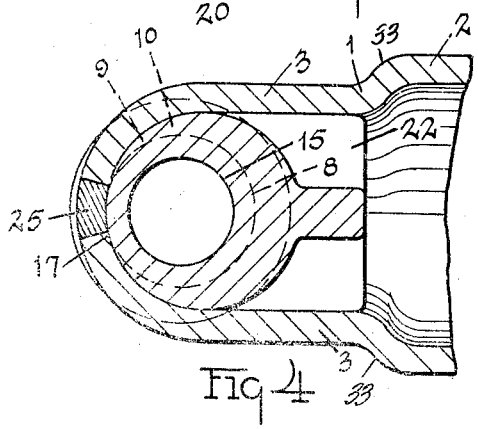
Figure 5:
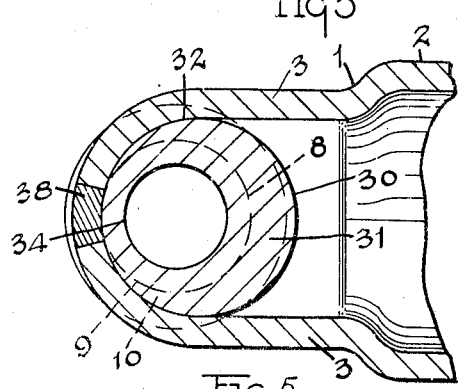
Figure 6:
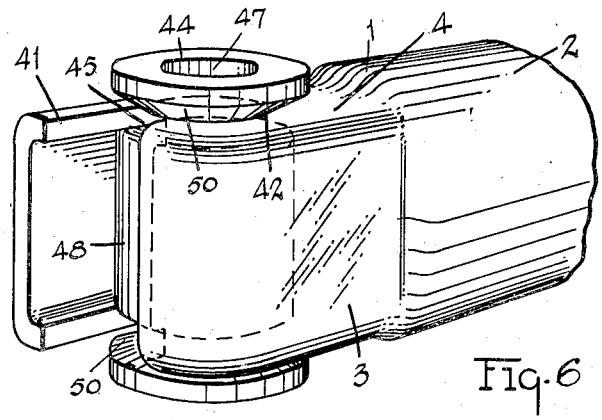
Figure 7:
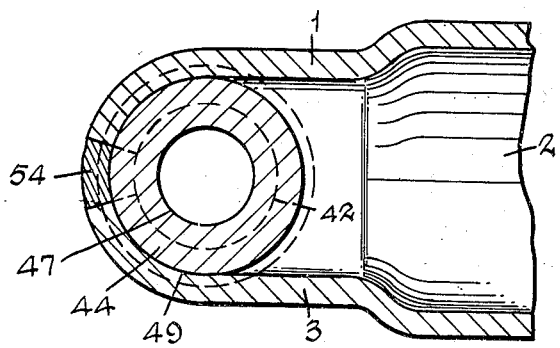

Fig. 1 is a view of a section of an end part of a tubular main axle having end portions shaped to receive the stub axle bearings, it being understood that the end parts of the tubular main axle are identical. Fig. 2 illustrates one of the bearings insertable in the end portion of the main axle. Fig. 3 illustrates a view of a section through the bearing and the main axle, taken in the plane of the axis of the bearing. Fig. 4 illustrates a horizontal section of the end part of the axle and bearing in the plane of the line 4—4 indicated in Fig. 3. Fig. 5 illustrates a horizontal section of the end part of the main axle and a modified form of bearing. Fig. 6 illustrates a perspective view of a further modified form of bearing and axle construction and illustrates the bearing partially secured in position in the end portion of the main axle. Fig. 7 is a view of a section of the bearing and axle structure illustrated in Fig. 6, and shows also a section of an end part of the tubular axle.

In the form of construction illustrated in Figs. 1, 2, 3, and 4, the axle is formed by cutting from a steel tubing, preferably a seamless steel tubing, of required dimensions as to thickness of wall and diameter, the required length allowing for subsequent processing as to thickness and shape of the walls at wheel and load connection points to produce a load sustaining and torque resisting axle having a large factor of safety. The thickness of the wall of the end portions of the main axle may be thus increased according to the stresses to be withstood and may be enlarged or reduced in its cross sectional area according to the dimensions of the yoke or other parts that connect the stub axles to the main axle.

Preferably the thickness of the walls of the end portions is increased and shaped to form flattened side portions and top and bottom portions and to produce cross sections substantially rectangular in shape, the sides having greater vertical dimensions than the width of the tops and bottoms substantially as illustrated in the figures. Thus the end portions 1 of the steel tubing 2 may be shaped to have the plane side portions 3, and the top and bottom plane portions 4 and 5 and flaring portions 33 and 35 where they unite with the body portions of the axle. The top and bottom portions are cut substantially semi-circularly and along lines tangential to the semi-circular cuts to form the edge portions 8 and 9 from the top and bottom of the end portions 1 whereby there is formed flanges 10 along the tangentially disposed lines. The flanges protrude inwardly from the flattened side portions 3. The edges of the flanges 10 are inclined outwardly with respect to each other and preferably terminate in the plane of the flattened side portions 3 at the outer ends of the side portions 3.

The bearing members are formed substantially spool shaped and have portions extending therefrom that are substantially rectangular in their outline and shaped to fit the interior surfaces of the rectangular shaped end portions of the tubular axle. As shown in Fig. 2, the bearing member 13 is formed to have channels 14 near its ends and the bore 15 for the king pin of the stub axle. The channels are provided with cylindrical bottoms concentric to the bore 15. The nearer lateral surfaces of the channels terminate at corners 16 that are formed by the semi-cylindrical surface 17. The surface 17 is tangential to the cylindrical surfaces of the bottoms of the channels 14. The cylindrical surface 17 has a diameter greater than the cylindrical surfaces of the bottoms of the channels 14 and is eccentric to the axis of the bore 15, and thus forms tapering shoulders 18. Preferably the surfaces that form the shoulders 18 are located in planes that are at right angles to the axis of the bore 15. The other lateral surfaces 19 of the channels 14 are frustumal in shape in that they flare outwardly from the axis of the bore 15 to form the heads 20. The flaring surfaces 19 of the channels 14 operate to guide the edges of the flanges 10 to the bottoms of the channels 14 and against the nearer lateral surfaces of the channels when the ends of the sides 3 are bent cylindrically about the bearing members or bushings and prevent buckling of the flanges.

A protruding, integrally formed, rectangular shaped portion 22 extends from between the bottoms of the channels 14 and has surfaces that form a continuation of the surfaces of the shoulders 18. Preferably the rectangular protruding portion 22 is formed to have an I-beam cross section having top and bottom flange portions that fit the interior of the end portion 1 of the tubular axle.

The edges of the flanges of the I-beam section are located tangential to the cylindrical part 17 and are parallel to each other, and the diameter of the cylindrical part and the width of the tops and bottoms of the protruding parts 22 is the same as the inside dimension between the flattened side portions 3. The diameter of the cylindrical bottoms of the channels 14 is the same as the circular edges of the edge portions 8 of the top and bottom walls of the end portions 1 of the axle. The bearing member may be fitted into position to locate the protruding member 22 within the inner end of the end portion 1 and the edge portions 8 and 9 of the top and bottom walls, and the flanges 10 will fit the surfaces or parts of the channels 14. The side walls 3 are wrapped around the cylindrical surface 17 of the bearing member 13, the end portions of the flanges 10 entering the remaining parts of the channels 14 to engage between the shoulders 18 and the flaring or frustumal surfaces 19, the frustumal surfaces 19 operating to force the edge surfaces of the flanges 10 to the bottoms of the channels 14 and prevent outward buckling that would otherwise ordinarily occur. The end edges of the sides 3 are located in opposed and closely spaced relation, as illustrated in the figures. The bearing is then integrally united with the parts of the end portions of the axle by welding the contiguous end edges of the sides 3, as indicated at 25, and welding the edges 8 and 9 of the top and bottom portions and the flanges 10 to the upper and lower lateral frustumal surfaces of the channels, as indicated at 26 and 27.

Inasmuch as the flanges 10 and edge portions of the top and bottom walls are shouldered against the top and bottom surfaces of the inwardly protruding I-beam part 22, and the shoulders 18 and these portions are interlocked by the weld, all possible displacement of the bearing member relative to the end of the axle, notwithstanding the severest commercial uses, is eliminated, this method of construction operating to increase the strength beyond that of the metal of the steel tubing, even though it is heat treated for maximum resistance to shearing stresses and torsional strains.

In the form of construction illustrated in Fig. 5 the protruding part 22 is omitted from the bearing member of the form shown in Fig. 2, the cylindrical surface of the body of the bearing member being extended to form a complete cylinder, as indicated at 30. The structure is otherwise the same and is assembled in the same manner as is done in connection with the form of construction illustrated in Figs. 1 to 4.

As shown in Fig. 5, portions 31, 32, 34, and 38 correspond with similar portions 13, 14, 15, and 25, respectively, of Figs. 1 to 4, and the bearing member 31 is integrally united with the contacting portions of the axle.

In the form of construction illustrated in Figs. 6 and 7, the axle 2 is first shaped in the same manner that the axle shown in Fig. 1 is shaped in advance of cutting the top and bottom walls of the end portions 1. The end portions 1 of the axle illustrated in Figs. 6 and 7 are cut to form the flanges 41 and the semi-circular edge portions 42, the edges of the flanges 41 being formed tangential and parallel to the circular edge portions 42 and preferably to have a width substantially the same throughout their length. The bearing member 44 is provided with the channels 45, the lateral surfaces being located in the planes located at right angles to the axis of the bore 47 of the bearing member. The central portion 48 of the bearing member has a cylindrical surface 49 having a diameter substantially the same as the distance between the inner surfaces of the sides 3 and concentric with the axis of the bore and the bottoms of the channels. The lateral surfaces 50 of the channels 45 are frustumal in shape and operate to force the edge portions of the flanges 41 to the bottoms of the channels 45 in the same manner as in the form of construction illustrated in Figs. 1 to 4, when the end portions of the sides 3 are bent around the cylindrical surface 49.

The bearing members 44 are integrally connected to the ends of the axle by welding the end edges of the side 3 and the ends of the flanges 41 to the cylindrical part 48, as indicated at 54, and welding the flanges 41 and the edge portions of the top and bottom walls to the flaring surfaces of the bearing member. When the bearing members are secured in position in the ends of the axle, the flanges and the top and bottom walls shoulder on the ends of the cylinder part 48 of the bearing, and they are locked in this position by the two welds which greatly strengthens the axle at the point of transmission of the torsional strains produced in the operation of the wheels as to steering or braking, and at the same time sustain the load strains occurring in the commercial use of the axle.

I claim:

1. In an axle, the body of the axle formed from steel tubing and having end portions formed substantially rectangular in cross-section, bushings having cylindrical portions and located in said end portions, each bushing having channels, one located at each end, the sides of the end portions having inwardly extending flanges, the edge portions of the top and bottom of the end portions and the flanges engaging the sides of the channels nearer to the axis of the end portions of the tubing, the sides of the channels more remote from the said axis of the tubing formed to have frustumal surfaces for guiding the flanges into fitting relation with the bottoms and the sides of the channels nearer the said axis of the tubing, the sides of the end portions curved cylindrically and fitting the outer side of the bushings, and welded to the said end portions.

2. In an axle, the body of the axle formed from steel tubing and having end portions formed substantially rectangular in cross-section, bushings having cylindrical portions and located in said end portions, each bushing having channels, one located at each end, the sides of the end portions having inwardly extending flanges, the edges of the flanges inclined to the sides and having their minimum width near the ends of the sides, the edge portions of the top and bottom of the end portions and the flanges fitting the sides of the channels nearer the axis of the tubing, the sides of the end portions curved cylindrically and fitting the outer side of the bushing, the surfaces of the sides of the channels more remote from the axis of the end portion of the tubing formed frustumal for preventing buckling of the flanges when the sides are bent cylindrically.

BERTIS H. URSCHEL.